United States Patent
Bryson et al.

[11] Patent Number: 5,877,104
[45] Date of Patent: Mar. 2, 1999

[54] METHOD OF PREPARING SILICON CARBIDE CERAMIC MATERIALS, AND STARTING COMPOSITIONS FOR USE WITH THIS METHOD

[75] Inventors: Nathan Bryson, Grigny; Bruno Bouri, Balaruc les Bains, both of France

[73] Assignee: Flamel Technologies, Venissieux Cedex, France

[21] Appl. No.: 817,923

[22] PCT Filed: Nov. 6, 1995

[86] PCT No.: PCT/FR95/01458

§ 371 Date: Jul. 8, 1997

§ 102(e) Date: Jul. 8, 1997

[87] PCT Pub. No.: WO96/15080

PCT Pub. Date: May 23, 1996

[30] Foreign Application Priority Data

Nov. 9, 1994 [FR] France .................................. 94 13728

[51] Int. Cl.⁶ .................................................. C04B 35/571
[52] U.S. Cl. ................................ 501/88; 528/10; 528/31; 528/33
[58] Field of Search ................................ 501/88; 528/10, 528/31, 33

[56] References Cited

U.S. PATENT DOCUMENTS

| | | | |
|---|---|---|---|
| 4,537,942 | 8/1985 | Brown-Wensley et al. | 528/12 |
| 4,604,367 | 8/1986 | Takamizawa et al. | 501/95 |
| 4,611,035 | 9/1986 | Brown-Wensley et al. | 525/474 |
| 4,639,501 | 1/1987 | Seyferth et al. | 501/88 |
| 4,704,444 | 11/1987 | Brown-Wensley et al. | 528/25 |
| 4,719,273 | 1/1988 | Seyferth et al. | 528/15 |
| 4,906,710 | 3/1990 | Burns et al. | 525/474 |
| 5,091,485 | 2/1992 | Noireaux et al. | 525/478 |

*Primary Examiner*—Anthony Green
*Attorney, Agent, or Firm*—Bacon & Thomas

[57] ABSTRACT

A method for preparing ceramic materials and/or precursors thereof from polysilanes of formula (I):

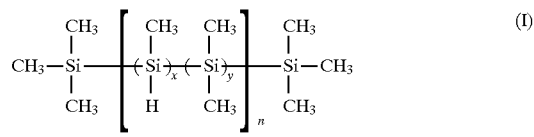

in which: $n \geq 1$, $x+y=1$, with: $0.3 \leq x \leq 1$ and, preferably, $0.5 \leq x \leq 0.8$, $0 \leq y \leq 0.7$.

Pyrolytic efficiency and the quality of the final ceramics may be increased by pyrolysis carefully selected polysilanes (I) in the presence of a catalytic amount of at least one boron compound and optionally in the presence of at least one unsaturated cross-linking agent, preferably a vinyl cross-linking agent. This method is useful for preparing ceramic articles such as fibres, films, binders and matrices for use, inter alia, in electronics, electro-optics, semiconductor technology and aeronautics.

22 Claims, No Drawings

METHOD OF PREPARING SILICON CARBIDE CERAMIC MATERIALS, AND STARTING COMPOSITIONS FOR USE WITH THIS METHOD

TECHNICAL FIELD

The field of the present invention is that of the preparation of silicon carbide based ceramic materials from polymer precursors of ceramics. These ceramic materials are in the form of fibres, films, binders, construction elements, matrices or analogues, and are intended for use inter alia in electronics, electro-optics, semiconductor technology, and aeronautics.

Obtaining such SiC based ceramics is carried out by pyrolysis, e.g. under vacuum, under inert atmosphere or in the presence of a reactive gas, of polymer precursor compounds, which are carbon and silicon compounds.

PRIOR ART

Research and development efforts in the field of the synthesis of SiC ceramic materials lies first of all upon the simplification of the methodology and upon the lowering of the costs of the method and the starting materials.

The disposition is sought of easily handled and easily stored ceramic precursors or synthetic intermediates having controllable properties (viscosity, melting point . . . ) and which are therefore adaptable in various types of formings specific to the final applications sought (fibres, coatings, films, matrices or analogues).

In addition, obtaining a ceramic of high SiC purity is sought, i.e. a ceramic with a Si/C molar ratio=1 and which has minimal amounts of impurities of the oxygen or free carbon type.

Finally and above all, it is the improvement of the yields of pyrolysis which constitutes the principal object to be achieved in the synthesis of SiC.

The starting materials used in this synthetic technology and which are thin in the context of the invention are in fact polysilanes, of which notably, lyalkylsilanes and, even more particularly, polymethylhydrogenosilanes MHS) and/or polyphenylhydrogenosilanes (PPHS).

PMHSs are traditionally prepared by condensation of ethyldichlorosilane ($MeSiHCl_2$) and an alkali metal, such as sodium:

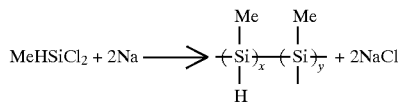

The analysis of these polymers by 1H NMR reveals that x ranges from 0.3 and 1, with x+y=1.

Such a preparation is notably described in the patent EP 0 152 704. This preparation suffers from being long (4 days), of low yield (lower than 60%) and from leading to polymer compounds of limited solubility. This patent thus discloses ceramic precursors obtained by allowing polyhydrogenosilanes of the polyphenylhydrogenosilane type to react with vinyl compounds, of the divinylbenzene type, in the presence of platinum. The polymer precursors are in fact solids and lead to low pyrolysis yields.

The patent application EP 0 217 539 also discloses a synthesis of polymethylhydrogenosilane (PMHS), which allows obtaining pasty liquid or solid products according to the conditions used. In particular, it is a question of ceramic precursors deriving from the cross-linking of PMHS in the presence of vinyl compounds and a hydrosilylation catalyst. This cross-linking is sensitive to increase the yields of pyrolysis.

An object of the patent application EP 0 382 651 is the preparation of polysilane ceramic precursors which are liquids at ambient temperature. Amongst the polysilanes concerned are copolymers with Si-vinyl and Si-H motifs with chain blockers derived from benzyl chloride or trimethylhydrogenosilane. These polymers may be mixed with Si-H motif homopolymers. The method of preparation considered also comprises a hydrolysis step of the polymer which notably increases the level of oxygen present in the polymer in a harmful way. It is known that high levels of $O_2$ disturb the yield of the pyrolysis and the purity of the SiC sought. Moreover, this document itself does not in any way mention the viscosity of the polymers obtained.

It arises from the foregoing that the above-mentioned prior art references propose ceramic precursors obtained by treating PMHSs with cross-linking agents of the unsaturated type and, most particularly, of vinyl nature. This known treatment corresponds to a hydrosilylation, leading to bridges between the SiH functions and the unsaturated groups used. Up to now, this hydrosilylation was only envisaged in resorting imperatively to catalysts of the radical initiator type, organometallic compounds, or even in carrying out a UV or high temperature heat activation. All this complicates the method since the control of the catalyst is always delicate, thereby leading to the unexpected formation of insoluble and useless polymers. Further, the catalysts employed are undesirable polluting metals. The yields of the pyrolysis of these pre-ceramics or hydrosilyl precursors are superior to those of the starting polyalkyls (polymethylsilanes).

In order to complete this review of the state of the art, it is convenient to point out a family of methods which is registered in a set of problems totally different from that of the actual invention. It is a matter in fact of using derivatives of boron with the view:

a) - either to favour the chemical transformation of polysilanes into polycarbosilanes which integrate, in a way different from polysilanes, carbon atoms in the principal chain of their polymer skeleton.

b) - or of incorporating boron in the final ceramic in a significant manner.

The objective a) reverts to the work of Professor Yajima which demonstrates the positive effect of the use of boron derivatives (polyborodiphenylsiloxane), within the context of the transformation of polydimethylsilane into polycarbosilane (Kumada transposition) (cf patents U.S. Pat. Nos. 4,220,600 - 4,248,814 - 4,283,376 - 4,604,367=DE-A-34 47 411). Given that these boron derivatives induce the appearance of carbon, it is clear that this technical information was not of the nature to incite their selection by the person skilled in the art seeking to prepare pre-ceramics and ceramics without excess of carbon.

Concerning objective b), BURNS and ZANK, as well as BANEY or WEST, described the treatment of polysilanes by metal carbonyls or compounds such as $BR_3$, with R=alkyl (EP 0 367 497, U.S. Pat. No. 4,906,710 and US 4,945,072), in a way as to form polymetallosilanes, themselves ceramic precursors doped with metals. In the same field, the patent U.S. Pat. No. 4,762,895 of CHANDRA et al. propose the preparation of metallopolysilanes from chlorosilanes and metallic derivatives (boron halides: $BBr_3$, $BCl_3$, $BClBr_2$, $BI_3$).

The mixed SiC/metal ceramic obtained by these methods have nothing to do with those covered by the invention.

The U.S. Pat. No. 4,604,367 (=DE-A-34 47 411) holds objectives a) and b) above, and de facto, the disadvantages pertaining thereto, notably on the final ceramics which are not pure (lower quality) and which cannot be obtained with high pyrolysis yields.

BRIEF DESCRIPTION OF THE INVENTION

In this state of knowledge, one of the aims of the invention is to provide a method of preparing ceramic materials and/or precursor thereof, from polyorganosilanes which do not have silicon atoms in their principal chain, which remedies the disadvantages of the prior art and which should satisfy the requirements of purity, yield, flexibility of use and economy sought in this technical field and which are mentioned in the preamble of the present text.

These aims and others are met by the present invention which relates to a method of preparing ceramic materials from polysilanes, characterised:

in that polysilane(s) is (are) selected from polyalkyl and/or aryl hydrogenosilanes of formula:

$$[(RSiH)_x (RSiL)_y (R_3^1Si)_z]_n \qquad (I)$$

in which:

R=a symbol representing identical or different radicals and representing hydrogen, a linear or branched substituted or non-substituted lower alkyl having 1 to 6 C, a substituted or non-substituted cycloalkyl having 3 to 6 C, or a substituted or non-substituted aryl having 6 to 10 C, preferably 6 C, $R^1$=a symbol representing identical or different radicals and representing hydrogen or an aliphatic group, alicyclic, preferably (cyclo)alkyl, (cyclo)alkenyl, linear or branched, aryl, aralkyl or aralkenyl, optionally substituted, methyl, ethyl and propyl groups being particularly preferred, L=radical being of the same definition as $R^1$ or even valential linking the silicon atom to another silicon atom belonging to another chain, $n \geq 1$, preferably $n \geq 3$ and, even more preferentially, $n \geq 10$, x+y=1, with:
$0.3 \leq x \leq 1$ and, preferably, $0.5 \leq x \leq 0.8$,
$0 \leq y \leq 0.7$,
$0 \leq z \leq 0.5$ and when z=0, the free valence of each terminal silicon is occupied by $R^2$, a symbol representing identical or different radicals and representing an H or a $C_1$–$C_6$ alkyl group, in that the polyalkylhydrogenosilanes (I) are pyrolysed in the presence of at least one boron compound for promoting the cross-linking of the polyalkyl-hydrogenosilanes by the formation of Si-Si bond and, optionally, of at least one carbon donating agent and formed by an unsaturated organosilicon cross-linking agent and, even more preferentially, by a vinyl silicon compound, and in that, further to the pyrolysis, at least one intermediate heat treatment of heating the polysilanes/cross-linking agent mixture is provided for, said treatment preceding the pyrolysis and taking place at a temperature between 150° and 350° C. and, even more preferentially, between 170° C. and 300° C.

DETAILED DESCRIPTION OF THE INVENTION

According to the present invention, an amount of boron compound is advantageously used which is sufficient to induce a catalytic effect and which is not significant enough so that the boron compound is considered as an additive or co-reagent.

The Applicant has had the merit of demonstrating that the combination of a selection of particular starting polysilanes (I), of a pyrolysis and an implementation of boron compounds, optionally with at least one carbon source, gives access to good pyrolysis yields while, in every case, these yields are higher than those obtained with the starting polysilanes and most of the time, are greater than 70%. An improvement of the purity and the quality of the final ceramics sought is noted. These are characterised, in certain cases, by a Si/C ratio in the order of 70/30, the impurities of the oxygen, free carbon and boron type being present in extremely reduced amounts.

According to an advantageous provision of the invention, the carbon source, also designated carbon donating agent, is further endowed with cross-linking properties regarding the polysilanes considered. The silicon compounds, of the alkynyl and/or alkenyl type, and in particular vinyl silicon compounds, are good examples of cross-linking carbon sources.

Preferably, the method comprises, in addition to the pyrolysis, at least one intermediate heat treatment of heating polysilanes or polysilanes/cross-linking agent mixture, said treatment preceding the pyrolysis and taking place at a temperature between 150° and 350° C. and, preferably, between 170° C. and 300° C.

It is clear that the conditions of duration/temperature of the intermediate heat treatment are obviously independent. In practice, it should be known that a duration of 1 minute to several hours (e.g. 10 hours) is preferably provided for and, even more preferentially, a duration of 5 to 120 minutes.

According to one of the essential characteristics of the invention, the starting polysilanes are advantageously polyalkyl and/or arylhydrogenosilanes. As examples, polymethylhydrogenosilanes and/or polyphenylhydrogenosilanes may be cited.

Without being limiting, polysilanes are used in a favoured way in which at least one part of the silicons situated in the chain are bearers only of one alkyl, aryl or aralkyl radical, the second substituent being only hydrogen.

It goes without saying that the invention is not limited to the polysilanes of one sole type, but also includes mixtures of various products of formula (I).

In addition to the linear structure according to (I), starting polysilanes can be cyclic products.

In accordance with an advantageous provision of the invention, these polyalkyl, aryl or aralkylhydrogenosilanes can result from the reaction of an alkali metal such as sodium with a mixture:

of dihalogenoalkyl, aryl or aralkylsilane ($X_2$SiHR) (e.g. dichloro-methylsilane=MeHSiCl$_2$), and a monohalogenoorganosilane [XSiH($R^1$)$_2$] with $R^1$, identical or different and representing a hydrocarbon radical, preferably an alkyl having 1 to 6 C, (e.g. monochlorohydrogenodimethylsilane).

These monohalogenoorganosilanes act as chain end blocking agents. It is therefore possible to regulate the length of the polymer chain by adjusting the proportion of the end blocking agent or termination agent. It results in an interesting control of the viscosity of the products synthesised, which gives access to a modulation and an adaptation of these pre-ceramics to the specific forming operations of each application aimed at: film, coating, matrix . . .

This also allows the introduction of a variable proportion of carbon by adjusting the $R^1$ substituents used. Finally, this participates in the increase of the yields of pyrolysis.

The method according to the invention therefore consists in carrying out the pyrolysis in the presence of boron (with or without an advantageously cross-linking C donor) and, preferably, in providing for an intermediate heat treatment.

The incorporation of the boron compound is advantageously carried out later, i.e. during the intermediate heat treatment.

LI a preferred way, the boron compound is a part of the starting products of the reaction with the polysilane.

The heat treatment of the invention is advantageously carried out under a confined inert atmosphere. This enables preventing any contamination and allows optimising the yield by minimising the losses of volatile products.

Amongst the methodological routes which may be envisaged for the method according to the invention:

1 - the continuous route, uninterrupted up to the final ceramics, 2- the discontinuous route in which the method is interrupted between the intermediate treatment of heating and the pyrolysis step, may notably be cited.

According to the continuous route (I), the starting polysilane (e.g. polymethylhydrogenosilane and/or polyphenylhydrogeno-silane) is mixed with at least one boron derivative, said mixture being then progressively increased in temperature up to 1,000°–1,500° C. in eventually providing for an intermediate plateau between 170° and 300° C.

In accordance with the discontinuous route (2), the polysilane (e.g. polymethylhydrogenosilane and/or polyphenylhydrogenosilane) is first of all mixed at ambient temperature with a catalytic amount of at least one boron derivative.

Before the pyrolysis, the intermediate heat treatment is proceeded with by heating the mixture at a temperature preferably between 170° and 300° C. for five minutes to several hours. The intermediate products, i.e. the precursors or pre-ceramics thus obtained by this method (2) according to the invention, constitute other objects of the latter.

After an interruption of a more or less long duration, which can be made use of for bringing the ceramics precursor (or pre-ceramic) thus obtained to ambient temperature, the classical pyrolysis is carried out (final pyrolysis temperature, for example, between 1,000° and 1,500° C).

For these two routes (1) and (2) of implementation of the method, it is advantageous to provide for an incorporation of at least one carbon donating agent, formed preferably by an unsaturated cross-linking agent, even more preferentially, by a vinyl silicon compound, in the reaction mixture.

This incorporation can take place, for example, simultaneously with the mixing of the starting polysilane and the boron compound, or during the interruption between the intermediate heat treatment and the pyrolysis in the discontinuous route (2).

As a matter of the forming of the polysilane composition in a configuration of a finished article, (film, wire . . . ), it takes place of course while the composition is in the form of a liquid, semi-liquid, paste or even in solution.

It is furthermore possible to fix the viscosity of the composition at a value adapted to the forming considered. This may, for example, be done by adjusting the viscosity of the polysilane (e.g. polymethylhydrogenosilane and/or polyphenylhydrogenosilane) or by selecting the nature and the concentration of the carbon source.

To a lesser extent, the nature of the boron compound and its concentration may also have effects in this respect.

As regards most particularly the discontinuous route (2), it is to be noted that the forming can be carried out during the interruption.

As an illustration, and in no way limiting, the nature of the boron derivatives are specified which can intervene within the context of the method of the invention.

Said boron derivatives are compounds with B - N, B - O, B - R, B - X =halogen bonds ...

The following families of these derivatives are, inter alia, to be considered:

the alkylborates of formula $R^4_a B(OR^5)_b$ in which:
a+b=3 and a=0, 1 or 2,
$R^4$ is an alkyl group having 1 to 20 carbon atoms,
$R^5$=R' or $R^5$=—SiR'R"R'"; R',R",R'" are identical or different and are selected from hydrogen or alkyl groups having 1 to 20 carbon atoms ; $B(OMe)_3$; $B(OEt)_3$; $B(OSiMe_3)_3$, will most particularly be cited amongst the compounds of this family, the alkylaminoboranes of formula : $R^4_a B(NR^5)_b$ in which:
a, b, $R^4$ and $R^5$ are such as defined above $B(NMe_2)_3$; $MeB(NMe_2)_2$; $B[N(SiMe_3)_2]_3$, will most particularly be cited amongst the preferred compounds of this family, the boratranes, which are polycyclic compounds, of formula : $B[O(CH_2)_c]_3N$ in which c=1, 2 or 3; $B(OCH_2CH_2)_3N$ will most particularly be cited amongst the preferred compounds of this family, the borazines, which are cyclic compounds, of formula:
—$(BR^4=NR^5-)_3$ in which:
$R^4$ and $R^5$ are such as defined above, it being possible for $R^4$ to further represent hydrogen ; in this family, the following compounds are particularly preferred: —$B(NH_2)=N(Me)$—$)_3$ ; —$[B(Me)=N(Me)]_3$, the alkylboroxines of formula : —$(BR^4{-}O{-})_3$ in which $R^4$ is such as defined above for the borazines; the preferred compounds of this family are: —$[B(Me)$—$O$—$]_3$, the alkoxyboroxines of formula: —$(B$—$(OR^6)$—$O$—$)_3$ in which $R^6=R^4$ or $R^5$ such as defined above; the preferred compounds of this family are:
—$(B(Me)=O$—$)_3$; —$(B(OMe)=O$—$)_3$, the boron trihalides of formula $BX'_3$ in which X'=Cl, Br, F. $BCl_3$ will most particularly be cited in this family.

the polyborodi(hydrogeno and/or alkyl and/or aryl)-siloxanes of formula:

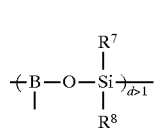

with $R^7$, $R^8$ identical or different from each other and selected from the following radicals: hydrogen, alkyls, alkoxyls, N-alkyls, aryls, aralkyls, alkenyls, aralkenyls, alkynyles, aralkynyles. Polyboro-diphenylsiloxane is a particularly preferred compound in this family.

It goes without saying that the above-mentioned boron derivatives can be used alone or as a mixture thereof.

It is convenient to note also that the preferred family according to the invention is that of the borates.

The boron compound is present at a rate of $10^{-2}$% to 10% by mass with respect to the mass of the starting polysilane, preferably $10^{-2}$% to 5% and, even more preferentially, $10^{-2}$% to 2%.

The cross-linking agent(s) associated with the starting polysilane(s) is (are) selected from the unsaturated organosilicon compounds of the type of those which comprise at least two double and/or triple bonds per molecule. In the case where the unsaturations carried by the silicons are of the alkenyl type, it is preferably a matter of a $C_2$–$C_6$ lower alkyl group, such as vinyl, alkyl, 1'-propenyl or 3-butenyl. The most particularly selected alkenyl is vinyl ($CH_2$=CH—). The unsaturations carried by the silicons can also be of the aralkenyl type, e.g. styryl.

(Co)polymers whose repeating unit is constituted by a motif:

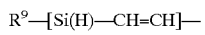

and/or —[$R^9$—Si(H)—C≡C]— and/or —[$R^9$—($U_i$)—Si—C≡C]— in which $R^9$ is hydrogen, a substituted or non-substituted lower alkyl having 1 to 6 carbon atoms ($CH_3$), a substituted or non-substituted cycloalkyl having 3 to 6 carbon atoms or a substituted or non-substituted aryl having 6 to 10 carbon atoms and $U_i$ is an unsaturated unit, preferably vinyl, or compounds of formulae:

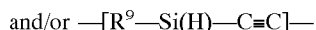

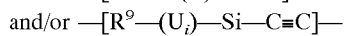

in which Y=O, S, NH, $NR^{11}$, $CH_2$, $CH_2CH_2$, phenyl; it being possible for Y to be absent, as, for example, in $R^{10}$ ($CH_2$=CH)$_{3-m}$, Si—Si(CH=$CH_2$)$_{3-q}$ $R^{10}{}_q$ (m, q=0, 1, 2, it being possible for m to be identical or different from q), ($CH_2$=CH)$_4$Si cyclo [$R^{10}$($CH_2$=CH)Si$Y^1$]$_p$ or [($CH_2$=CH)$_2$Si$Y^1$]p, $Y^1$ representing O, S, NH, $NR^{11}$, $CH_2$, CH=CH, C≡C; p≧2 when $Y^1$=NH, $NR^2$, S, $CH_2$, CH=CH, C≡C and p≧3 when $Y^1$=O; $R^{10}$ being a $C_1$–$C_6$ lower alkyl or a $C_6$–$C_{10}$ aryl, substituted or not, $R^{11}$ being of the same definition as $R^{10}$ and being able to be identical or different from the latter, it being possible for the above-mentioned compounds to be substituted with substituted vinyl groups, substituted or non-substituted alkyl groups, in the place of the vinyl groups.

In accordance with the invention, tetravinylsilane and polyvinylsilanes are particularly appreciated carbon donating agents and cross-linking agents. The polyvinylsilanes may notably be those defined in the patent U.S. Pat. No. 4,783,516.

Advantageously, the incorporation of carbon source cross-linking agent(s) intervene during a prior heat treatment step. This step consists in preparing, by intimate mixing, a starting composition which comprises:

at least one polysilane of formula (I), preferably polymethylhydrogenosilane and/or polyphenylhydrogenosilane, at least one boron compound, preferably a borate, and, optionally, at least one carbon donating agent and formed, preferably, by a vinyl compound and, even more preferentially, constituted by a vinylsilane.

A further object of the invention is the above-mentioned starting composition for preparing ceramic materials and/or precursors thereof.

In accordance with an interesting but not indispensable method of the method of the invention, the use is provided for of at least one chemical and/or physical promoter of cross-linking. Radical initiators such as AzobisIsoButyroNitrile (AIBN) may be cited as examples of known and appropriate promoters, as regarding the chemical means, and irradiation, e.g. UV or electronic bombardment, as regards the physical means.

It arises from the foregoing that the method according to the invention enables obtaining pure ceramics of high quality in a relatively cost-effective and rapid way.

INDUSTRIAL APPLICATION

The fact that the method according to the invention allows controlling the viscosity of the pre-ceramics or ceramic precursors must also be underlined, which thus confers thereto an adaptability to the different forming modes, which are specific to the ceramic articles sought, coating films, fibres, etc.

Finally, it is important to note that the method is economical.

The invention shall be better understood and more of its advantages shall arise well from the following examples which describe the synthesis of ceramics according to the invention, starting polysilanes, envisagable boron catalysts, as well as certain methodological variants of the synthesis.

EXAMPLES

The polysilanes which can be used according to this invention are for example the polymethylsilanes whose synthesis is described in the patent applications EP 0 152 704, EP 0 217 539 and EP 0 382 651.

Example 1

Preparation of a Polymethylhydrogenosilane (A) From a MeSiHC$_2$/Me$_2$SiHCl Mixture Into a 0.5 liter reactor with double jacket equipped with mechanical stirrer (impeller) a condenser and a thermometric probe is introduced 250 ml of anhydrous toluene, 60.0 ml of anhydrous dioxane and 41.05 g of sodium (1.78 moles). The reaction mixture is brought to 100°–102° C. The mixture of molten sodium and solvent is then stirred vigorously (600–700 turns/minute) in order to obtain a fine sodium suspension. The system is left to stabilise for 5 to 10 minutes so as to obtain a homogeneous suspension. A mixture of 80.0 ml of methyldichlorosilane (0.69 mole) and 2.0 ml of dimethylchlorosilane Me$_2$SiHCl (0.018 mole) are then added dropwise. In order to limit the reflux, part of the heat is removed by circulating a heat-absorbing fluid. At the end of the addition, the reaction mixture is refluxed for 30 minutes. The mixture obtained is then cooled rapidly to ambient temperature. The PMHS (A) obtained is recovered after a series of steps which include at least one filtration, one washing and at least one evaporation of the solvent.

Mass obtained: 29.05 g.

Appearance of the PMHS (A): transparent colourless oil.

Yield with respect to the starting chlorosilanes: 82.5%.

Formulation according to $^1$H NMR analysis: SiH/Si= 0.55–0.58.

Dynamic viscosity of the product at room temperature : 3200 cPs.

Contrary to the methods according to EP 0 152 704, EP 0 217 539 and EP 0 382 651, the synthesis of the PMHS (A) described above allows a good control of the viscosity of the polymer.

The cross-linking sources of carbon used are either polyvinylsilanes (PVS) or tetravinylsilane.

Example 2

Preparation of Polyvinylsilane (B)

Into a 0.5 liter reactor with double jacket equipped with mechanical stirrer (impeller), a condenser and a thermometric probe, is introduced 190 ml of anhydrous toluene, 30 ml of anhydrous tetrahydrofuran and 41.05 g of sodium (1.78 moles). The reaction mixture is brought to 100°–102° C. The mixture of molten sodium and solvent is then stirred vigorously (700–800 turns/minute) in order to obtain a fine sodium suspension. The system is left to stabilise for 5 to 10 minutes so as to obtain a homogeneous suspension. A mixture of 99.0 ml of a mixture of chlorosilanes composed of methyldichlorosilane, trimethylchlorosilane $Me_3SiCl$ and vinylmethyldichlorosilane, (the respective proportions are the following; 0.5/0.3/1.0.) is then added dropwise. In order to limit the reflux, part of the heat is removed by circulating a fluid at 85°–90° C. in the double jacket. At the end of the addition, the reaction mixture is refluxed for 15–30 minutes. The mixture obtained is then cooled to ambient temperature. 40 mg of BHT are added to the PVS (B) obtained which is then recovered after a series of steps which include at least one washing and at least one evaporation. For more specifications, the methodologies reported in U.S. Pat. No. 4,783,516 may be referred to.

Appearance of the PVS (B): transparent oil.

Yield with respect to the starting chlorosilanes: 81%.

Dynamic viscosity of the product at room temperature : 900 cPs.

Example 3

Comparative Tests: Effect of the Boron on a Polymethylhdrogenosilane/Tetravinylsilane Mixture A - Without Boron:

Into a Schlenk tube is introduced under nitrogen 3.07 g of polymethylsilane (A) (89.8%) and 0.35 g of tetravinylsilane (10.2%). The mixture is stirred at ambient temperature for 10 to 15 minutes. A transparent homogenous liquid is then obtained.

Viscosity of the mixture measured at ambient temperature : 280–300 cp.

This mixture is submitted to the following heat treatment:
Cross-Linking:
Firstly, the mixture is heated at 120° C. under nitrogen for 12 to 15 hours. A cross-linked resin is thus obtained which is solid and insoluble.
Pyrolysis
1st experiment
The product obtained after cross-linking is then pyrolysed under the following conditions:
from ambient T° to 230° C.:2° C./minute,
plateau of 4 hours at 230° C.,
from 230° C. to 1,000° C.:2° C./minute,
plateau of 1 hour at 1,000° C.
The yield of this pyrolysis is 65.4%.
2nd experiment
The product is pyrolysed according to the following pyrolysis programme:
from ambient T° to 1,000° C.:2° C./minute,
plateau of 1 hour at 1,000° C.
The yield of this pyrolysis is 62.5%.

B - With boron (Route(1))

Into a Schlenk tube is introduced under nitrogen 3.33 g of polymethylsilane (A) (88.5%) and 0.44 g of tetravinylsilane (11.5%) and 0.083 g of $B(OSiMe_3)_3$, i.e. 2% of $B(OSiMe_3)_3$ for 100 g of mixture. The three products are stirred at ambient temperature for 10 to 15 minutes. A transparent homogeneous liquid is thus obtained.

Viscosity of the mixture measured at ambient temperature: 250–300 cp.

This mixture is submitted to the following heat treatment:
Cross-Linking
Firstly, the mixture is heated at 120° C. under nitrogen for 12 to 15 hours. A cross-linked resin is thus obtained which is solid and insoluble.
Intermediate Heat Treatment and Continuous Pyrolysis
1st experiment
The product obtained is then pyrolysed under the following conditions:
from ambient T° to 230° C.: 2° C./minute,
plateau of 4 hours at 230° C.,
from 230° C. to 1,000° C.:2° C./minute,
plateau of 1 hour at 1,000° C.
The yield of this pyrolysis is 75.7%.
2nd experiment
The product is pyrolysed according to the following pyrolysis programme:
from ambient T° to 230° C.:2° C./minute,
plateau of 10 hours at 230° C.
from 230° C. to 1,000° C.:1° C./minute,
plateau of 1 hour at 1,000° C.,
The yield of this pyrolysis is 78,0%.

Example 4

Preparation, Intermediate Heat Treatment and Pyrolysis of a Polymethylhydrogenosilane/ Polyvinylsilane Mixture by Continuous Route:Route(1)—Advantages of the Use of a Boron Based Additive—Comparative Test In a Schlenk tube, a mixture composed of 60% of polymethylsilane (A) (60.2%) and 40% of Polyvinylsilane (B) (39.8%) is prepared. A portion of this mixture is treated without addition of $B(OSiMe_3)_3$ (product a), in a second portion is added 2% by mass of $B(OSiMe_3)_3$ (product b), finally, in a third portion, 4% by mass of $B(OSiMe_3)_3$ (product c) is added. The three mixtures are stirred at ambient temperature for 10 to 15 minutes. Transparent homogeneous liquids are thus obtained.

These mixtures are submitted to the following heat treatment:
Cross-Linking
Firstly, the mixture is cross-linked by a treatment at 130°–140° C. under nitrogen for 12 to 15 hours.
Intermediate Heat Treatment And Continuous Pyrolysis
The products obtained after cross-linking are then pyrolysed according to the following pyrolysis programme:
from ambient T° to 230° C.: 2° C./minute,
plateau of 5 hours at 230° C.,
from 230° C. to 1,000° C.:1° C./minute,
plateau of 3 hours at 1,000° C.
The yields of these pyrolyses are:
product (a): 60.9%,
product (b): 66.7%,
product (c): 68.2% respectively.

Example 5

Preparation, Intermediate Heat Treatment of a Polymethylhydrogenosilane/Borate Mixture—Use of this Mixture for the Preparation of Ceramics after Incorporation of Tetravinylsilane via Discontinuous Route:Route (2)

The following example describes the preparation and the use of a SiC precursor according to the following steps:

1 - intermediate heat treatment of the PMS by a boron derivative,

2 - addition of a carbon donating and cross-linking agent,

3 - pyrolysis of the mixture to obtain the ceramic.

1 - The polymethylsilane (A) is used in the present example. In a degassed Schlenk tube under nitrogen is introduced 3.32 g of polymethylsilane and 15 1 of B(OSiMe$_3$)$_3$. The mixture is stirred and heated in an oil bath at 210° C. for 1 hour. The reactor is then rapidly cooled to ambient temperature. A yellow solid is obtained.

Mass : 3.21 g.

Yield : 91.2%.

2 - The product obtained above is mixed with 1.45 ml of a cross-linking agent, tetravinylsilane. This compound acts as diluent of the polymethylsilane treated with the boron. After 1 hour of stirring, a pasty mixture is obtained which can be moulded.

3 - The mixture obtained above is then brought to 130° C. for 4 hours under nitrogen. Part of the product is brought to ambient temperature. An infusible and insoluble solid is thus obtained. The other part of the product is pyrolysed under nitrogen at 10° C./minute up to 1,000° C. The yield of this pyrolysis is 82.3%.

Example 6

Comparative Tests of Treatment of the Polymethylhydrogenosilanes With and Without Boron Derivative 1- Preparation of Polymethylhydrogenosilane (A$_1$)

In a 1 l reactor with double jacket equipped with mechanical stirring, a condenser and a thermometric probe, is introduced 450 ml of anhydrous toluene and 85.0 g of sodium (3.69 moles). The toluene+sodium mixture is heated at 100° C. and vigorously stirred so as to obtain a suspension. Methyldichlorosilane, MeHSiCl$_2$ 160 ml (1.53 mole) is then added with the aid of a syringe at the rate of 55 ml per minute. An intense black coloration appears as soon as the introduction of the chlorosilane however that the temperature inside of the reactor is kept between 104° and 106° C. After the end of the addition, the reaction mixture is refluxed for 4 hours. The mixture obtained is then cooled to ambient temperature and the salts are separated by filtration under nitrogen. The precipitate is washed with 4 portions of 100 ml of toluene, and then the filtrates are mixed and concentrated by distillation of the solvent under vacuum at 30° C. 44.5 g of PMHS (A$_1$) are recuperated as an opaque yellow oil. The yield with respect to the starting chlorosilane is 65.9%. The spectroscopic analysis by proton NMR shows that the polymer is of the following formula:

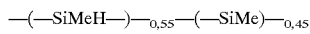
—(—SiMeH—)—$_{0.55}$—(—SiMe)—$_{0.45}$

2- Intermediate Heat Treatment of the Polymethylhydrogenosilane (A$_1$) In The Presence of Tris (Trimethylsilyl)-Borate=Preparation of MMHS (A$_{11}$)

In a degassed Schlenk tube under nitrogen is introduced 3.52 g of polymethylsilane (A$_1$) and 0.08 ml (0.066 g i.e. 0.2 mmol.) of tris(trimethylsilyl)borate B(OSiMe$_3$)$_3$. The mixture is then stirred at room temperature for 5 to 10 minutes, and the reactor is then immersed in an oil bath thermostated at 240° C. The formation of a few vapours is noted which condense on the cold part of the tube. After 40 to 50 minutes of treatment, a thickening of the reaction mixture is observed. The treatment is stopped after 1 hour of reaction, the mixture is then brought to ambient temperature by steeping with air. 3.08 g of PMHS (A11) are recovered as a yellow solid easily dissolved in toluene, hexane, tetrahydrofuran and chloroform. Yield : 87.5%.

3 - Intermediate Heat Treatment of Polymethylhydrosilane (A$_1$)=Preparation of (A$_{12}$)

Under the conditions described in paragraph 2, the heat treatment of the polymethylhydrogenosilane (A$_1$) is carried out in the absence of tris(trimethylsilyl)borate. After 1 hour at 240° C., 2.89 g of PMS (A$_{12}$) are recuperated as a viscous yellow oil Yield: 93%.

THERMAL ANALYSES

YIELDS OF PYROLYSIS

| PMS | Pyrolysis in oven | Thermogravimetric analysis |
|---|---|---|
| (A$_1$) | 28.0% | 9.8% |
| (A$_{12}$) | 16.2% | 10.9% |
| (A$_{11}$) | 72.1% | 70.6% |

Temperature programme of the thermogravimetric analyses:
from 20° C. to 950° C. - 10° C./min without plateau.

Temperature programme of the pyrolyses in oven:
from 20° C. to 1,000° C. - 5° C./min, plateau of 1 hour at 1,000° C.

Example 7

Influence of the Nature of the Boron Compound

A - Case of a Borate (B(OEt)$_3$)

Into an inerted Schlenk tube is introduced 1.65 g of polymethylsilane (A$_1$) of Example 11 and 50 1 of triethylborate, B(OEt)$_3$. The mixture is then stirred at ambient temperature for 5 to 10 minutes and then the reactor is immersed directly into n oil bath thermostated at 220°–230° C. After 1 hour of reaction a thickening of the reaction mixture is observed. The treatment is stopped after 2 hours of reaction and the mixture is then brought to ambient temperature by steeping with air. After removing the volatile compounds, 1.49 g of a yellow solid are recovered.

Yield: 90.3%. _o The spectroscopic analysis by proton NMR shows that the compound has the following formula:

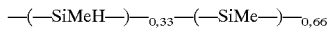
—(—SiMeH—)—$_{0.33}$—(—SiMe—)—$_{0.66}$

The compound obtained is then pyrolysed in a tubular oven under nitrogen.

Flow of nitrogen: 100 ml/minute.

Temperature programme: from 20° C. to 1,000° C. at 5° C./minute, followed by a plateau of 60 minutes at 1,000° C.

Pyrolysis yield: 71%.

B - Case of a Boratrane (B(OCH$_2$CH$_2$)$_3$N)

In an inerted Schlenk tube is introduced 2.27 g of polymethylsilane (A$_2$) and 14 mg of triethanolamineborane, B(OCH$_2$CH$_2$)$_3$N. The mixture is then stirred at ambient temperature for 5 to 10 minutes, and then the reactor is immersed directly in an oil bath thermostated at 220°–230° C. After a few minutes' reaction, a thickening of the reaction medium is observed. The treatment is stopped after 15 minutes' reaction and the mixture is then brought to ambient temperature by steeping with air. After the removal of the volatile compounds by distillation under vacuum, 2.08 g of a yellow solid are recovered.

Yield:91.5%.

The spectroscopic analysis by proton NMR shows that the compound has the following formula:

$$-(-SiMeH-)-_{0.41}-(-SiMe-)-_{0.59}$$

The compound obtained is then pyrolysed in a tubular oven under nitrogen.

Nitrogen flow: 100 ml/minute.

Temperature rise programme: from 20° C. to 1,000° C. at 5° C./minute, followed by a plateau of 60 minutes at 1,000° C.

Yield of pyrolysis:73%.

Example 7

Preparation of Polyphenylhydridosilane

The whole of the preparation was carried out under inert atmosphere of nitrogen, unless otherwise indicated.

20 ml of phenyldichlorosilane (Petrarch Systems, Inc., Bristol, Pa., USA) (the silane had been distilled under vacuum before use) was added dropwise over 1 hour 50 minutes at room temperature (about 20° C.) to 7 g of a mixture, stirred with the aid of a mechanical stirrer, of a dispersion of sodium freed from mineral oil by washing with oxygen-free hexane under nitrogen atmosphere, and covered with 150 ml of dry, oxygen-free tetrahydrofuran (THF). The product was stirred for three days and the red mixture obtained was filtered in order to remove the dispersion of sodium in excess and the NaCl. 5 g of copper (1) chloride were added to the filtrate and the mixture was stirred with a mechanical stirrer for one day. The solution, now yellow, was filtered and the tetrahydrofuran was removed from the filtrate under reduced pressure leaving 10.9 g of a pale yellow solid polymer. A spectroscopic analysis showed that the composition of the solid corresponded to the following formula:

$$[Si(C_6H_5)H]_{0.51}[Si(C_6H_5)_2H]_{0.49}$$

which conserves the valency of four. This polymer was treated rapidly in air in the form of a solid without significant modification.

Example 8

Starting Composition=PMHS-Polyphenylsilane

To 9.5 g of PMHS (A) (example 1), are mixed 0.5 g of polyphenylsilane of example 7.

8.1 Without Boron

The mixture is pyrolysed at 1,000° C. with a plateau of 120 minutes at 22° C.

Yield of ceramic: 62%.

Elementary analysis of the ceramic material obtained: Si=55%, C=30%.

8.2 With Boron

To this mixture is added 0.2 g of tris(trimethylsilylborate) in order to obtain a homogeneous mixture which is then pyrolysed under nitrogen at 1,000° C. with a plateau of 120 minutes at 22° C.

Yield of ceramic:78%.

Elementary analysis of the ceramic material obtained:Si=68%, C=30%.

We claim:

1. Method for preparing silicon carbide (SiC) based ceramic materials by pyrolysing polysilanes comprising the steps of:

(a) selecting the polysilanes from polyalkyl and/or aryl-hydrogenosilanes of formula (I):

$$[(RSiH)_x(RSiL)_y(R_3^1Si)_z]_n \qquad (I)$$

in which:

R=a symbol representing identical or different radicals and representing hydrogen, a linear or branched substituted or non-substituted lower alkyl having 1 to 6 C, a substituted or non-substituted cycloalkyl having 3 to 6 C, or a substituted or non-substituted aryl having 6 to 10 C, $R^1$=a symbol representing identical or different radicals and representing hydrogen or an aliphatic group or an alicyclic group, L is a radical having the same definition as $R^1$ or is a bond linking the silicon atom to another silicon atom belonging to another chain, $n \geq 1$, $x+y=1$, with:

$0.3 \leq x \leq 1$, $0 \leq y \leq 0.7$, $0 \leq z \leq 0.5$ and when z=0, the free valence of each terminal silicon is occupied by $R^2$, a symbol representing identical or different radicals and representing an H or a $C_1$–$C_6$ alkyl;

(b) preparing a mixture of polysilanes and crosslinking agent comprising:

at least one boron compound for promoting crosslinking of the selected polysilanes of formula (I) by formation of Si—Si bond, and optionally at least one carbon donating agent which is formed of an unsaturated organosilicon crosslinker;

(c) providing at least one intermediate heat treatment of the polysilanes and crosslinking agent mixture; and (d) pyrolysing the polysilanes and crosslinking agent mixture.

2. Method according to claim 1, wherein the intermediate heat treatment lasts from about 1 minute to about 10 hours.

3. Method according to claim 1, wherein the boron compound is added to the selected polysilanes of formula (I) no later than during the intermediate heat treatment of step (c).

4. Method according to claim 1, wherein the unsaturated organosilicon crosslinker is selected from the group consisting of tetravinylsilane, the polyvinylsilanes and mixtures thereof.

5. Method according to claim 1, wherein for formula (I) in step (a) $n \geq 3$ and $0.5 \leq x \leq 0.8$.

6. Method according to claim 5, wherein $n \geq 10$.

7. Method according to claim 1, wherein R is a substituted or non-substituted aryl having 6 carbons.

8. Method according to claim 1, wherein $R^1$ is selected from the group consisting of linear or branched (cyclo)alkyl, linear or branched (cyclo)alkenyl, aryl, linear or branched aralkyl and linear or branched aralkenyl groups.

9. The method according to claim 1, wherein $R^1$ is a substituted methyl, ethyl or propyl group.

10. Method according to claim 2, wherein the intermediate treatment lasts from about 5 minutes to about 120 minutes.

11. Method according to claim 1, wherein the polysilane of formula (I) is polymethylhydrogenosilane and/or polyphenylhydrogenosilane the boron compound is a borate, and the optional carbon donating agent is a vinylsilane.

12. The method of claim 1 wherein the intermediate heat treatment and the pyrolysis take place continuously by heating said mixture to first produce an intermediate temperature plateau of 170°–300° C. during said heating and then continuously heating said mixture without interruption to produce said pyrolysis.

13. The method of claim 1 wherein the mixture is first heated to provide said intermediate heat treatment, the heating is interrupted and then after said interruption, the mixture is reheated to produce said pyrolysis.

14. The method of claim 1 wherein boron is present in said mixture of polysilane and crosslinking agent in an amount of $10^{-2}\%$ to 10% by mass with respect to the mass of the selected polysilanes of formula (I).

15. The method of claim 1 which further comprises a step of shaping said mixture of polysilanes and crosslinking agent to form a shaped article before pyrolysis.

16. Method according to claim 1, wherein the boron compound is selected from the group consisting of:

the alkylborates of formula $R^4_aB(OR^5)_b$ in which:
a+b=3 and a=0, 1 or 2,
$R^4$ is an alkyl group having 1 to 20 carbon atoms,
$R^5$=R' or $R^5$=SiR'R''R'''; R', R'', R''' are identical or different, and are selected from hydrogen or alkyl groups having 1 to 20 carbon atoms, the alkylaminoboranes of formula: $R^4_aB(NR^5)_b$ in which: a, b, $R^4$ and $R^5$ are as defined above, the boratranes of formula: $B[O(CH_2)_c]_3N$ in which: c=1, 2 or 3, the borazines of formula: $-(BR^4=NR^5-)_3$ in which: $R^4$ and $R^5$ are as defined above, it being also possible for $R^4$ to further represent hydrogen, the alkylboroxines of formula: $-(BR^4-O-)_3$ in which: $R^4$ is as defined above for the borazines, the alkoxyboroxines of formula: $-(B-(OR^6)-O-)_3$ in which:
$R^6$=$R^4$ or $R^5$ wherein $R^4$ and $R^5$ are as defined above, the boron trihalides of formula $BX'_3$ in which: X'=Cl, Br, F, and the polyborodi(hydrogen and/or alkyl and/or aryl) siloxanes of formula:

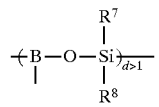

in which $R^7$ and $R^8$ are hydrogen and/or alkyl and/or aryl.

17. Method according to claim 16, wherein:
the alkylborate is $Be(OMe)_3$, $B(OEt)_3$ or $B(OSiMe_3)_3$;
the alkylaminoborane is $B(NMe_2)_3$, $MeB(NMe_2)_2$ or $B[N(SiMe_3)_2]_3$;
the boratrane is $B(OH_2CH_2)_3N$;

the borazine is $-(B(NH_2O=N(Me)-)_3$ or $-[B(Me)=N(Me)]_3$;
the alkylboroxine is $-[B(Me)-O-]_3$
the alkoxyboroxine is $(Be(Me)=O-)_3$ or $-(B(OMe)=O-)_3$;
the boron trihalide is $BCl_3$; and
the polyborodi(hydrogen and/or alkyl and/or aryl) siloxane is polyborodiphenylsiloxane.

18. A ceramic precursor composition which comprises:
at least one polysilane of formula (I):

$$[(RSiH)_x(RSiL)_y(R_3^1Si)_z]_n \qquad (I)$$

in which:
R=a symbol representing identical or different radicals and representing hydrogen, a linear or branched substituted or non-substituted lower alkyl having 1 to 6 C, a substituted or non-substituted cycloalkyl having 3 to 6 C, or a substituted or non-substituted aryl having 6 to 10 C, $R^1$=a symbol representing identical or different radicals and representing hydrogen or an aliphatic group or an alicyclic group, L is a radical having the same definition as $R^1$ or is a bond linking the silicon atom to another silicon atom belonging to another chain, $n \geq 1$,
x+y=1, with:
$0.3 \leq x \leq 1$,
$0 \leq y \leq 0.7$,
$0 \leq z \leq 0.5$ and when z=0, the free valance of each terminal silicon is occupied by $R^2$, a symbol representing identical or different radicals and representing an H or a $C_1$–$C_6$ alkyl;

at least one boron compound;
and, optionally, at least one carbon donating agent.

19. The composition of claim 18, which comprises:
at least one polysilane of formula (I),
at least one boron compound,
and, optionally, at least one carbon donating agent formed of a vinyl compound.

20. The composition of claim 19 wherein the vinyl compound is a vinylsilane.

21. The composition of claim 20 wherein the boron compound is a borate.

22. The composition of claim 21 wherein the polysilane is selected from the group consisting of polymethylhydrogenosilane, polyphenylhydrogenosilane and mixtures thereof.

* * * * *